US010986083B2

(12) United States Patent
Li et al.

(10) Patent No.: US 10,986,083 B2
(45) Date of Patent: *Apr. 20, 2021

(54) HARDWARE IDENTIFICATION-BASED SECURITY AUTHENTICATION SERVICE FOR IOT DEVICES

(71) Applicant: Verizon Patent and Licensing Inc., Arlington, VA (US)

(72) Inventors: Feng Li, Lexington, MA (US); Dahai Ren, Lincoln, MA (US); Ming Chen, Bedford, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/671,418

(22) Filed: Nov. 1, 2019

(65) Prior Publication Data

US 2020/0068401 A1 Feb. 27, 2020

Related U.S. Application Data

(63) Continuation of application No. 15/597,243, filed on May 17, 2017, now Pat. No. 10,499,246.

(51) Int. Cl.
*H04L 29/06* (2006.01)
*H04W 76/12* (2018.01)
(Continued)

(52) U.S. Cl.
CPC ...... *H04L 63/0823* (2013.01); *H04L 63/1466* (2013.01); *H04W 12/00512* (2019.01);
(Continued)

(58) Field of Classification Search
CPC .......... H04L 63/0823; H04L 63/1466; H04W 76/12; H04W 12/0602; H04W 12/0609;
(Continued)

(56) References Cited

U.S. PATENT DOCUMENTS 8,627,422 B2 1/2014 Hawkes et al.
9,693,229 B2 6/2017 Christian et al.
(Continued)

OTHER PUBLICATIONS

Google scholar search results.*
"Google scholar search results", Google scholar search results, Aug. 11, 2019.

*Primary Examiner* — Qun Shen

(57) ABSTRACT

A method, a device, and a non-transitory storage medium are provided to store a hardware identifier that uniquely identifies an IoT device; perform an attachment procedure with a wireless network, wherein the attachment procedure includes authenticating the IoT device by the wireless network and establishing a bearer connection; establish a secure channel with an authentication device via the bearer connection, in response to successfully completing the attachment procedure; transmit, to the authentication device, a first request to authenticate the IoT device, wherein the first request includes the hardware identifier; receive, from the authentication device, a first response that indicates whether the IoT device is authenticated; and determine that the IoT device is authenticated based on the first response.

20 Claims, 11 Drawing Sheets

(51) Int. Cl.

| | | |
|---|---|---|
| *H04W 12/00* | (2021.01) | |
| *H04W 12/04* | (2021.01) | |
| *H04W 12/06* | (2021.01) | |
| *H04L 29/08* | (2006.01) | |
| *H04W 4/70* | (2018.01) | |

(52) U.S. Cl.
CPC ... *H04W 12/0401* (2019.01); *H04W 12/0403* (2019.01); *H04W 12/0602* (2019.01); *H04W 12/0609* (2019.01); *H04W 76/12* (2018.02); *H04L 63/0876* (2013.01); *H04L 63/166* (2013.01); *H04L 67/12* (2013.01); *H04W 4/70* (2018.02)

(58) Field of Classification Search
CPC ......... H04W 12/0403; H04W 12/0401; H04W 12/00512
See application file for complete search history.

(56) References Cited

U.S. PATENT DOCUMENTS

| | | | |
|---|---|---|---|
| 9,722,803 B1 | 8/2017 | Ellingson et al. | |
| 9,820,146 B2 | 11/2017 | Gross et al. | |
| 9,917,821 B2 | 3/2018 | Gillmore et al. | |
| 9,967,732 B2* | 5/2018 | Campbell | H04W 12/004 |
| 10,015,766 B2 | 7/2018 | Britt | |
| 10,045,335 B2* | 8/2018 | Chen | H04W 72/085 |
| 10,116,549 B2 | 10/2018 | Altin et al. | |
| 10,142,819 B2 | 11/2018 | Chennakeshu | |
| 2010/0048161 A1 | 2/2010 | He et al. | |
| 2016/0212695 A1* | 7/2016 | Lynch | H04W 48/18 |
| 2018/0007557 A1* | 1/2018 | Lee | H04W 12/08 |
| 2018/0132293 A1 | 5/2018 | Escott et al. | |

* cited by examiner

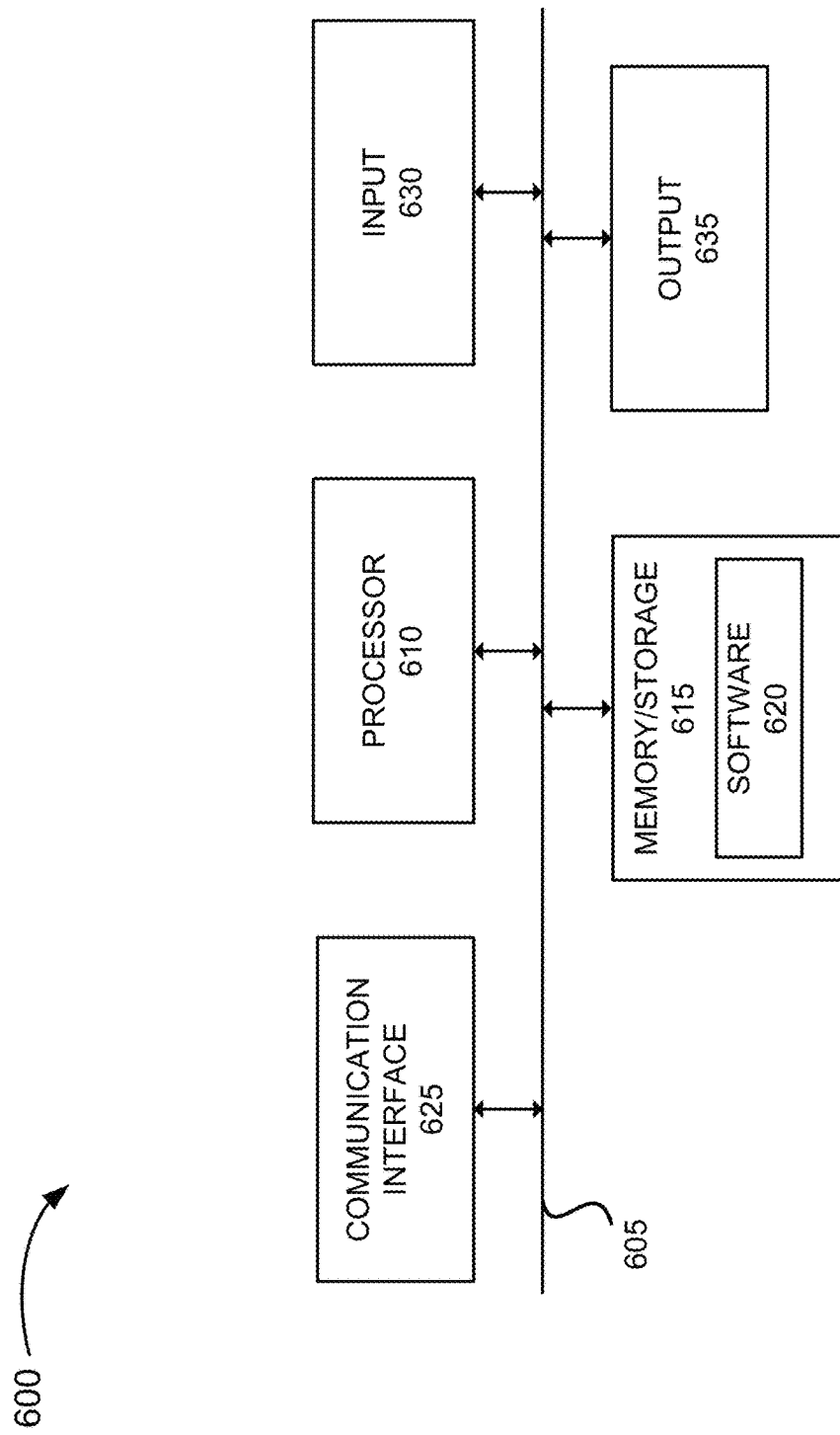

HARDWARE IDENTIFICATION-BASED SECURITY AUTHENTICATION SERVICE FOR IOT DEVICES

CROSS REFERENCE TO RELATED APPLICATION

This patent application is a continuation of U.S. patent application Ser. No. 15/597,243 filed on May 17, 2017, the disclosure of which is hereby incorporated by reference herein in its entirety.

BACKGROUND

Internet of Things (IoT) technology refers to a wide range of devices. Since IoT technology has nearly limitless applications that can be leveraged to form new and useful services, interest among service providers and developers in IoT technology continues to increase. However, service providers and developers are always mindful of security issues, and the access of an IoT device to a network, as well as its impact on network resources in the network.

BRIEF DESCRIPTION OF THE DRAWINGS

FIG. 6 is a diagram illustrating exemplary components of a device that may correspond to one or more of the devices illustrated herein;

DETAILED DESCRIPTION OF PREFERRED EMBODIMENTS

Figure 1:
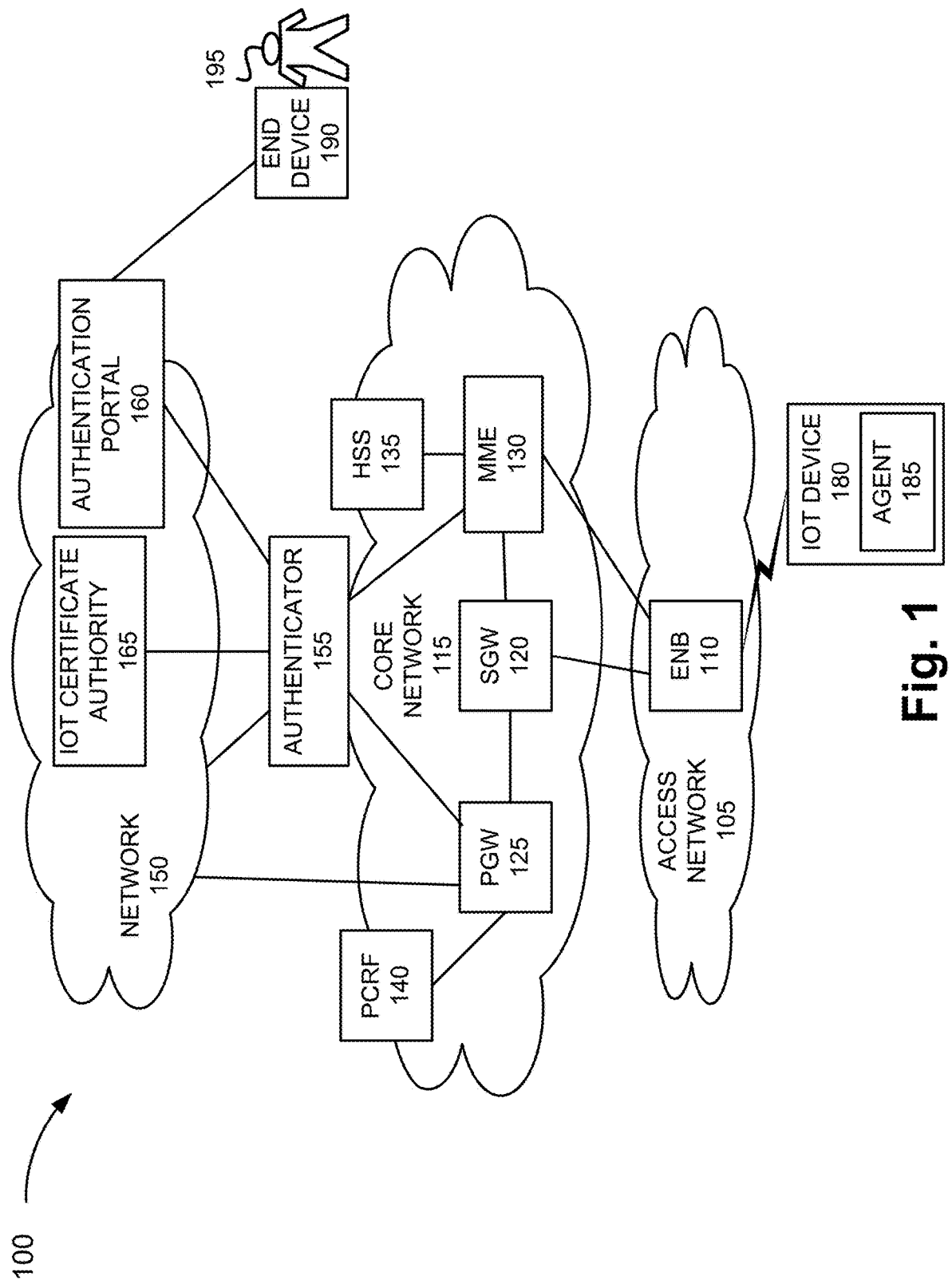
FIG. 1 is a diagram illustrating an exemplary environment in which an exemplary embodiment of an authentication service may be implemented.

The following detailed description refers to the accompanying drawings. The same reference numbers in different drawings may identify the same or similar elements. Also, the following detailed description does not limit the invention.

IoT devices have become widespread and their uses have continued to expand. While the expansion of IoT devices offers various benefits, security issues are always present. For example, typically, an IoT device communicates with an access network (e.g., a base station or other type of wireless node) to initially establish a connection to a network device in a network. By way of further example, the IoT device transmits a radio resource control (RRC) request message, which carries an International Mobile Equipment Identity (IMEI) or a Mobile Directory Number (MDN) of the IoT device, to the base station. The RRC request message is in a plain text format and subject to security vulnerabilities (e.g., spoofing, etc.). Also, the ability of the network to detect a security breach, which may occur subsequent to attachment, only occurs after a certain amount of data has been communicated by or to the IoT device.

Also, many IoT devices are "disposable devices," which may not belong to its final users. For example, smart meters installed on residential properties are owned by the water company and not the owners of the residences. A user (e.g., a business user, etc.) may need to enable or dispatch a batch of IoT devices in a geographic area, which can require a change in core network elements (e.g., configuration, provisioning of subscription data, etc.). For example, there may be changes needed in a database (e.g., a home subscriber server (HSS), an equipment identity register (EIR), etc.) and other network elements (e.g., a mobility management entity (MME), a gateway device, etc.). However, the network service provider may not wish to grant the user access to these network elements because of the consequences (e.g., service down time, etc.) stemming from a mistake (e.g., a misconfiguration by the user, a data entry error, etc.) that may occur due to the access. Thus, the network service provider may be forced to allocate resources (e.g., personnel, network infrastructure, etc.) to configure the network elements on behalf of the user. Further, the network service provider may not wish to grant generic data access to the IoT devices.

According to exemplary embodiments, an authentication service is provided. According to an exemplary embodiment, the authentication service provides authentication to IoT devices. According to an exemplary embodiment, the authentication service is provided subsequent to the attachment of the IoT device with a network (e.g., an access network, a core network), but before the IoT device is able to communicate with an external network. According to an exemplary embodiment, the authentication service authenticates the IoT device based on a hardware identifier that uniquely identifies the IoT device. According to an exemplary embodiment, when the authenticator service determines that the hardware identifier is not valid, the authentication service may invoke a detachment procedure. As a result, the authentication service may detect a security breach, subsequent to attachment and before any amount of data has been communicated by or to the IoT device via the attached network. According to an exemplary embodiment, the hardware identifier may be communicated by the IoT device to the authentication service via a secure channel such that any security risk of tampering (e.g., data integrity issue of the hardware identifier, etc.) may be minimized.

FIG. 1 is a diagram illustrating an exemplary environment 100 in which an exemplary embodiment of an authentication service may be implemented. As illustrated, environment 100 includes an access network 105, a core network 115, and a network 150. Access network 105 includes an evolved Node B (eNB 110). Core network 115 includes a serving gateway 120, a packet data network (PDN) gateway (PGW) 125, a mobility management entity (MME) 130, a home subscriber server (HSS) 135, and a policy and charging rules function (PCRF) 140. Network 150 includes an authenticator 155, an authentication portal 160, and an IoT Certificate Authority (CA) 165. Environment 100 also includes an end device 190 and a user 195.

According to other embodiments, environment 100 may include additional networks, fewer networks, and/or different types of networks than those illustrated and described herein. For example, environment 100 may include a WiFi network, a local area network (LAN), or other type of network that provides access to or can be used as an on-ramp to access network 105. Additionally, although access network 105 and core network 115 each include a device of a Long Term Evolution (LTE) network or an LTE-Advanced (LTE-A) network, according to other exemplary implementations, access network 105 and core network 115 may each be implemented according to another wireless network standard. For example, access network 105 may be implemented to include a radio access network (RAN) of a Third Generation (3G), a 3.5G, or a future generation (e.g., a Fifth Generation (5G)). Also, core network 115 may be implemented to include a Code Division Multiple Access (CDMA) core network, a Global System for Mobile Communications (GSM) core network (e.g., a network switching subsystem (NSS)), or other type of network (e.g., 3G, 3.5G, etc.).

Environment 100 includes communication links between the networks and between the devices. Environment 100 may be implemented to include wired, optical, and/or wireless communication links among the devices and the networks illustrated. A communicative connection via a communication link may be direct or indirect. For example, an indirect communicative connection may involve an intermediary device and/or an intermediary network not illustrated in FIG. 1. The number and the arrangement of communication links illustrated in environment 100 are exemplary.

A device may be implemented according to a centralized computing architecture, a distributed computing architecture, or a cloud computing architecture (e.g., an elastic cloud, a private cloud, a public cloud, etc.). Additionally, a device may be implemented according to one or multiple network architectures (e.g., a client device, a server device, a peer device, a proxy device, and/or a cloud device).

eNB 110, SGW 120, PGW 125, MME 130, HSS 135, and PCRF 140 may each operate according to an LTE or an LTE-A Third Generation Partnership Project (3GPP) standard. Additionally, one or multiple of these elements may include logic that supports the authentication service, as described herein. HSS 135 may include an equipment identity register (EIR).

Network 150 may include one or multiple networks of one or multiple types. For example, network 150 may be implemented to include a service or an application-layer network, the Internet, the World Wide Web, an Internet Protocol Multimedia Subsystem (IMS) network, a Rich Communication Service (RCS) network, a cloud network, a packet-switched network, a private network, a public network, an IP network, or some combination thereof.

Authenticator 155 includes a device that has computational and communicative capabilities. According to an exemplary embodiment, authenticator 155 includes logic that provides the authentication service, as described herein. According to an exemplary embodiment, authenticator 155 includes logic that establishes a secure channel with IoT device 180. According to an exemplary embodiment, authenticator 155 includes logic that determines whether a hardware identifier of IoT device 180 is valid. According to an exemplary embodiment, authenticator 155 includes logic that generates and provides a token to IoT device 180. For example, the token may be implemented to include data that indicates one or multiple instances of data, such as a session identifier, a starting time and ending time of a session, that the entity in possession of the token has been authenticated, and/or other type of data (e.g., restrict a session to certain operations, etc.). According to an exemplary embodiment, authenticator 155 includes logic that stores a profile of IoT device 180 that has been previously provisioned in authentication portal 160. According to an exemplary embodiment, authenticator 155 includes logic that may issue a key to IoT device 180 subsequent to successful verification of hardware identifier of IoT device 180. For example, the key may be a public key, a private key, or both according to a public key infrastructure (PKI), and may be used for encryption/decryption of data, authentication, etc. As illustrated in FIG. 1, authenticator 155 may reside downstream from PGW 120.

Authentication portal 160 includes a device that has computational and communicative capabilities. According to an exemplary embodiment, authentication portal 160 includes logic that provides an authentication service. According to an exemplary embodiment, authentication portal 160 includes logic that provides user interfaces that allow a user (e.g., user 195) to upload and/or configure profiles for IoT devices. According to an exemplary implementation, the IoT profile of an IoT device includes a hardware identifier (e.g., an IMEI, a media access control (MAC) address, etc.) that uniquely identifies IoT device 180. The IoT profile may also include other types of information, such as attribute data. For example, the attribute data may indicate the type of IoT device (e.g., a weather sensor, a video camera, a medical device, etc.), a make and model of the IoT device, mobility information (e.g., a fixed or stationary device versus a mobile device), a category of IoT service associated with the IoT device (e.g., a medical service, a security service, a consumer appliance service, etc.), and/or a location of the IoT device (e.g., XYZ store, GPS coordinate, etc.). The IoT profile may also include rules and/or policies pertaining to the IoT device. For example, the rules and/or policies may indicate a server to which the IoT device is permitted to connect to, a number of data transmissions over a time period (e.g., 1/per hour, etc.), and/or other policy or rule that pertains to the use of a network. Depending on the implementation, the service provider of the authentication service and/or the network provider may need to approve the IoT profiles (e.g., policies and/or rules) pertaining to the IoT devices. According to an exemplary embodiment, authentication portal 160 includes logic that provisions authenticator 155 with information included in the IoT profile.

IoT certificate authority 165 includes a device that has computational and communicative capabilities. According to an exemplary embodiment, IoT certificate authority 165 includes logic that provides a certificate authority service. For example, IoT certificate authority 165 may issue a certificate. As an example, IoT certificate authority 165 may issue a Secure Sockets Layer (SSL) certificate (also known as a digital certificate). IoT certificate authority 165 may issue a key.

IoT device 180 includes an end device that has computational and communicative capabilities. IoT device 180 may be implemented as a meter device associated with providing a utility service (e.g., gas, electric, etc.), a smart device (e.g., a sensor device, a home security system, a healthcare device, etc.), or other type of device pertaining to a field of use in IoT technology, such a retail, transportation, smart energy, telematics, logistics, and so forth.

According to an exemplary embodiment, IoT device 180 includes an agent 185. Agent 185 includes logic that provides the authentication service, as described herein. For example, agent 185 may include logic that establishes a secure channel with authenticator 155 subsequent to completion of an attachment procedure with access network 105 and core network 115, but before communication is initiated to network 150. Agent 185 may include logic that requests verification of a hardware identifier of IoT device 180 from authenticator 155. Agent 185 may also include logic that requests a key from authenticator 155 in response to successful verification. Additionally, agent 185 may include logic that obtains a certificate from IoT certificate authority 165 based on the key. Agent 185 may also include logic that uses a token, which is obtained from authenticator 155, to communicate to a network device (e.g., an IoT server) of network 150 (not illustrated in FIG. 1) to provide an IoT service. Further, agent 185 may validate a certificate of the network device.

End device 190 includes a communicative and computational device. End device 190 may be implemented as a mobile device, a portable device, or a stationary device. For example, end device 190 may be implemented as a smartphone, a tablet, a phablet, a netbook, a computer (e.g., a laptop, a desktop, a palmtop, etc.), a personal digital assistant, a terminal, and so forth. According to an exemplary embodiment, end device 190 provides user 195 access to authentication portal 160. For example, end device 190 includes a client, such as a web browser or other suitable software application. Additionally, user 195 may upload and/or configure IoT profiles, via end device 190, to authentication portal 160. User 195 is an operator of end device 190. For example, user 195 may be a network administrator, a third party (e.g., a vendor, a merchant), and so forth. User 195 may use the authentication service provided for IoT devices, as described herein.

Figure 2A:
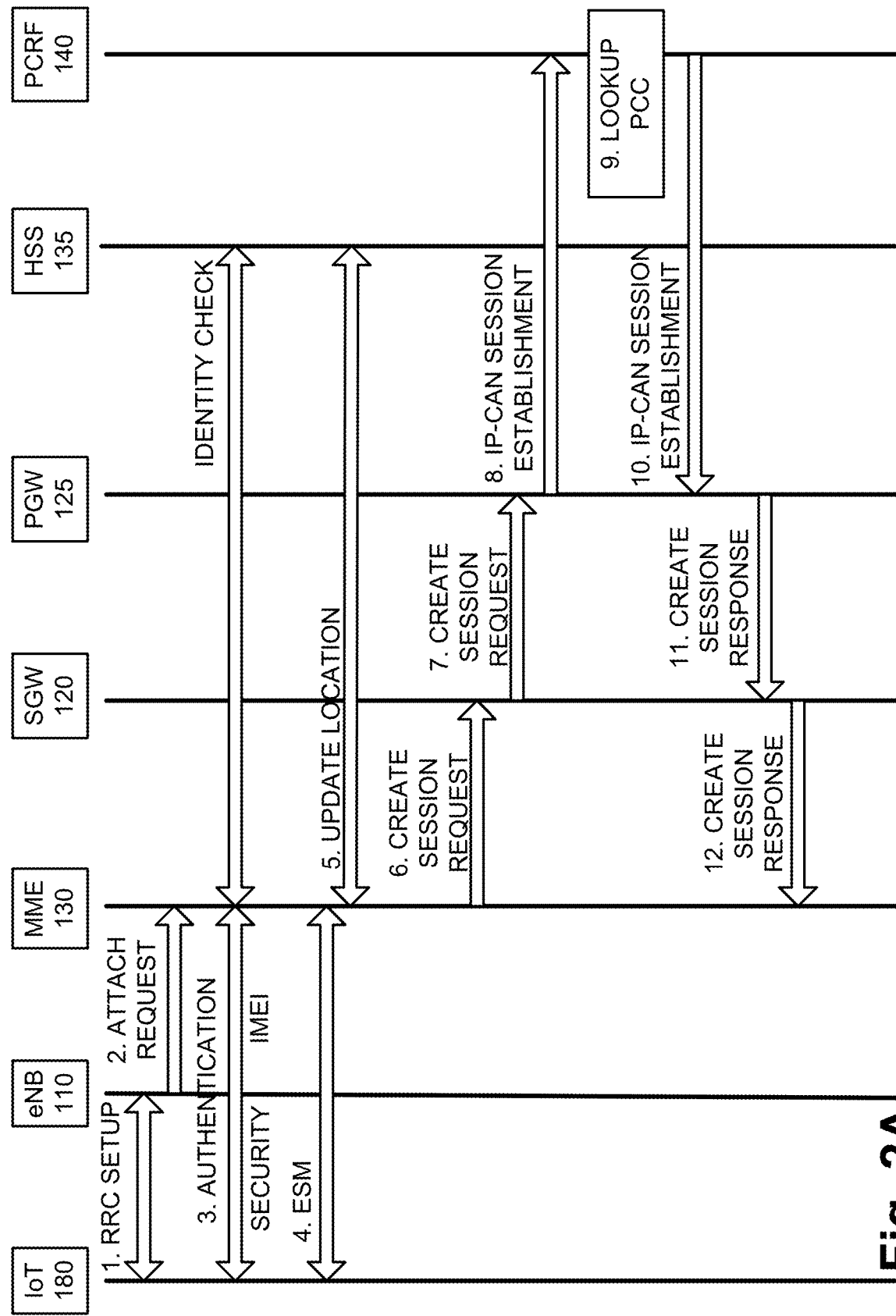
FIGS. 2A and 2B are diagrams illustrating an exemplary process of an attachment procedure between an IoT device and a wireless network.
Figure 2B:
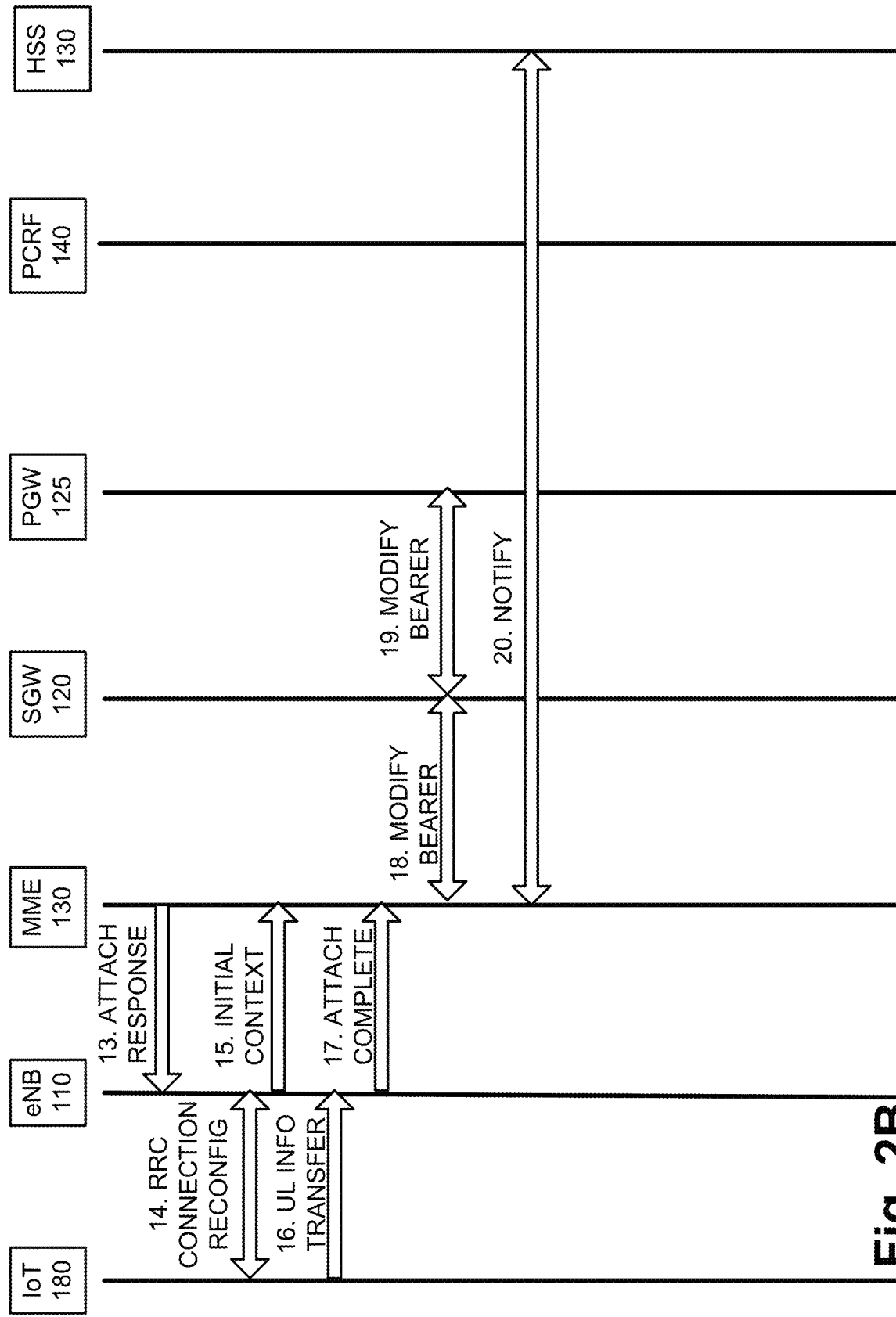

FIGS. 2A and 2B are diagrams illustrating an exemplary embodiment of an attachment procedure that may occur prior to the invocation of the authentication service. The messages explained and illustrated are exemplary and do not represent each and every message that may be exchanged during the attachment procedure. For example, a random access procedure, which is not illustrated in FIG. 2A, may take place before a radio resource control (RRC) connection establishment procedure.

Referring to FIG. 2A, IoT device 180 and eNB 110 exchange messages to establish an RRC connection, as illustrated by messages one (1) (RRC setup). For example, IoT device 180 transmits an RRC Connection Request to eNB 110, eNB 110 transmits, in response, an RRC Connection Setup, and IoT device 180 transmits, in reply, an RRC Connection Setup Complete, which also includes a non-access stratum (NAS) attach request. eNB 110 transmits an Attach Request, which includes a PDN Connectivity Request, to MME 130, as illustrated by message two (2) (Attach Request).

After an RRC connection is established, an authentication procedure begins, as illustrated by messages three (3) (Authentication/Security) and (Identity Check). The authentication/security messaging may include an IMEI or an MDN. In turn, MME 130 and HSS 135 exchange messages, as further illustrated by message three (3), according to a mobility equipment (ME) identity check procedure. For example, MME 130 transmits an ME Identity Check Request to the EIR of HSS 135, and in response, the EIR of HSS 135 checks the identity status of IoT device 180 (e.g., whether it is known, whether it has been stolen, to verify that it does not have faults, etc.). EIR of HSS 135 transmits an ME Identity Check Answer, which carries data indicating the result of the identity check, to MME 130. Dependent on the result of the identity check, MME 130 may determine whether or not to continue with the attachment procedure.

According to this exemplary scenario, it may be assumed that MME 130 decides to continue with the attachment procedure.

As illustrated in messages four (4) (Evolved Packet System Session Management (ESM)), MME 130 and IoT device 180 exchange messages (e.g., ESM Information Request/Response) for ESM information. Thereafter, MME 130 and HSS 135 exchange messages, illustrated in messages five (5) (Update Location). For example, MME 130 transmits an Update Location Request to HSS 135. In response to receiving the Update Location Request, HSS 135 accesses stored subscription data pertaining to IoT device 180. HSS 135 generates and transmits an Update Location Request Answer that carries the subscription data.

In response to receiving the Update Location Request Answer and absent any failure (e.g., access restrictions, subscription restrictions, etc.), MME 130 initiates the establishment of a PDN connection. For example, MME 130 transmits a General Packet Radio Service Tunneling Protocol (GTP) Create Session Request to SGW 120, as illustrated by message six (6) (Create Session Request), and SGW 120 transmits a Create Session Request to PGW 125 (e.g., a Create Default Bearer Request), as illustrated by message seven (7). In steps eight (8) through ten (10), an IP-CAN Session Establishment procedure is performed between PGW 125 and PCRF 140, in which policy control and charging (PCC) information is obtained pertaining to IoT device 180. In response to receiving the PCC information, PGW 125 may create an entry in its Evolved Packet System (EPS) bearer context table and generate a charging identifier. In turn, PGW 125 transmits a Create Session Response to SGW 120 (e.g., a Create Default Bearer Request), as illustrated by message eleven (11) (Creation Session Response), and SGW 120 transmits a Create Session Response (e.g., a Create Default Bearer Request), as illustrated by message twelve (12) (Create Session Response).

Referring to FIG. 2B, MME 130 transmits an Attach Response, as illustrated by message thirteen (13). For example, the Attach Response may include messages, such as an S1AP Initial Context Setup Request, an NAS Attach Accept, and an Activate Default Bearer Request. As further illustrated, IoT device 180 and eNB 110 transmit messages (e.g., an RRC Connection Reconfiguration (Attach Accept) and an RRC Connection Reconfiguration Complete), as illustrated by message fourteen (14) (RRC Connection). The RRC Connection Reconfiguration messaging may indicate to activate the default bearer. As further illustrated by message fifteen (15), eNB 110 transmits a message (e.g., an Initial Context Setup Response) to MME 130, illustrated as message fifteen (Initial Context). Additionally, IoT device 180 transmits uplink information (e.g., a Direct Transfer (Attach Complete) message) to eNB 110, illustrated as message sixteen (16), and eNB 110 transmits an Attach Complete to MME 130, illustrated as message seventeen (17). In response to receiving the Initial Context message and the Attach Complete message, MME 130 transmits a Modify Bearer Request message to SGW 120, illustrated as message eighteen (18), (Modify Bearer), which is sent to PGW 125 and acknowledged by PGW 125, as illustrated in message nineteen (19) (Modify Bearer), and transmitted back to MME 130. In response to receiving the Modify Bearer Response, MME 130 transmits a Notify Request message, which may include the APN and PGW ID, to HSS 135, and in turn, HSS 135 stores this information, and transmits a Notify Response to MME 130, as illustrated in message twenty (20) (Notify).

While FIGS. 2A and 2B illustrate exemplary messaging and describe exemplary processes that provide an attachment of IoT device 180 to access network 105 and core network 115, according to other embodiments, IoT device 180, network elements of access network 105, and/or network elements of core network 115 may perform additional, different, and/or fewer steps or processes to provide for the attachment of IoT device 180.

As previously described, there are deficiencies in the authorization and/or authentication procedures that occur in the attachment procedure described in FIGS. 2A and 2B. For example, the RRC request message is vulnerable to a security attack due to the plain text nature of the message. Also, when IoT device 180 passes the identity check in step three (3), IoT device 180 may have full network access and be out of control by the carrier. As a result, the carrier may detect that IoT device 180 is not authorized to access and use the network only after a certain amount of data has been transmitted by IoT device 180 via a bearer (e.g., a default bearer).

Figure 3:
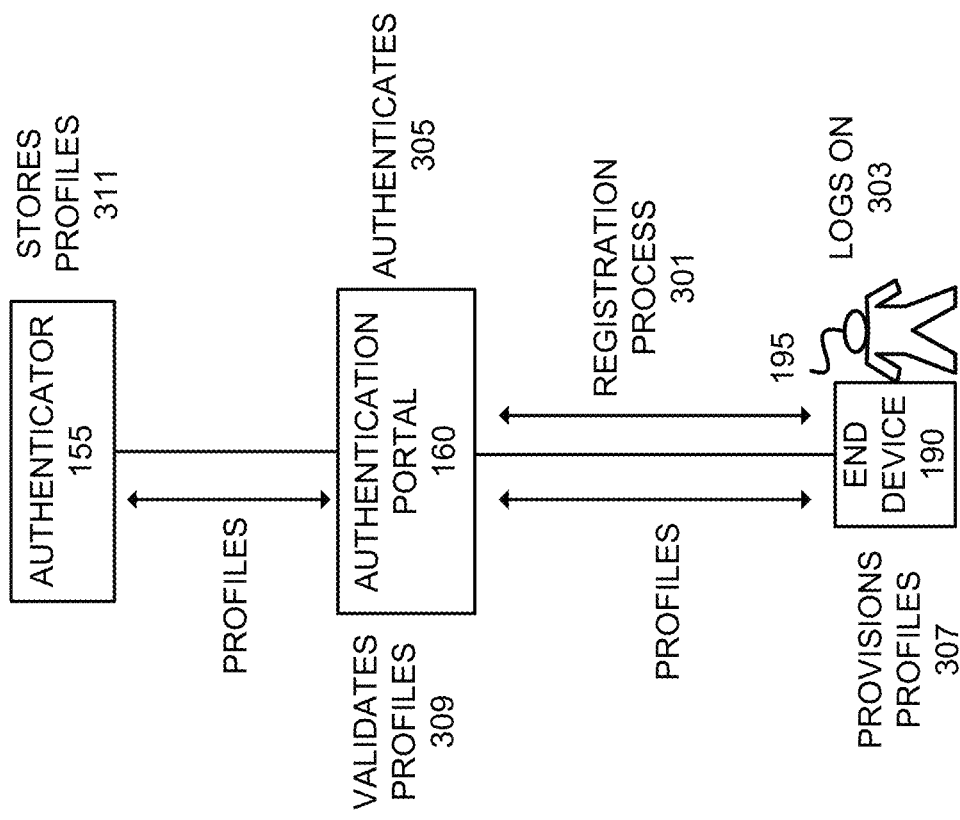
FIG. 3 is a diagram illustrating an exemplary process of the authentication service.

FIG. 3 is a diagram illustrating an exemplary process pertaining to the authentication service. Referring to FIG. 3, user 195 may register (301) with authentication portal 160 as a part of an on-boarding to the authentication service. During the registration process, user 195 may provide user credentials, via a graphical user interface, to authentication portal 160. User 195 may also provide other information, such as inventory data. For example, the inventory data may include identifier data pertaining to each IoT device 180, the number of IoT devices 180, location data pertaining to IoT device 180, attribute data pertaining to IoT device 180 (e.g., a sensor, a video camera, etc.), a make and model of IoT device 180, and/or the like. Additionally, or alternatively, user 195 may provide one or multiple instances of the various types of inventory data during the provisioning of an IoT profile, as described herein. Authentication portal 160 may generate a subscriber profile, which includes the user credentials, pertaining to user 195 and the authentication service.

Figure 4:
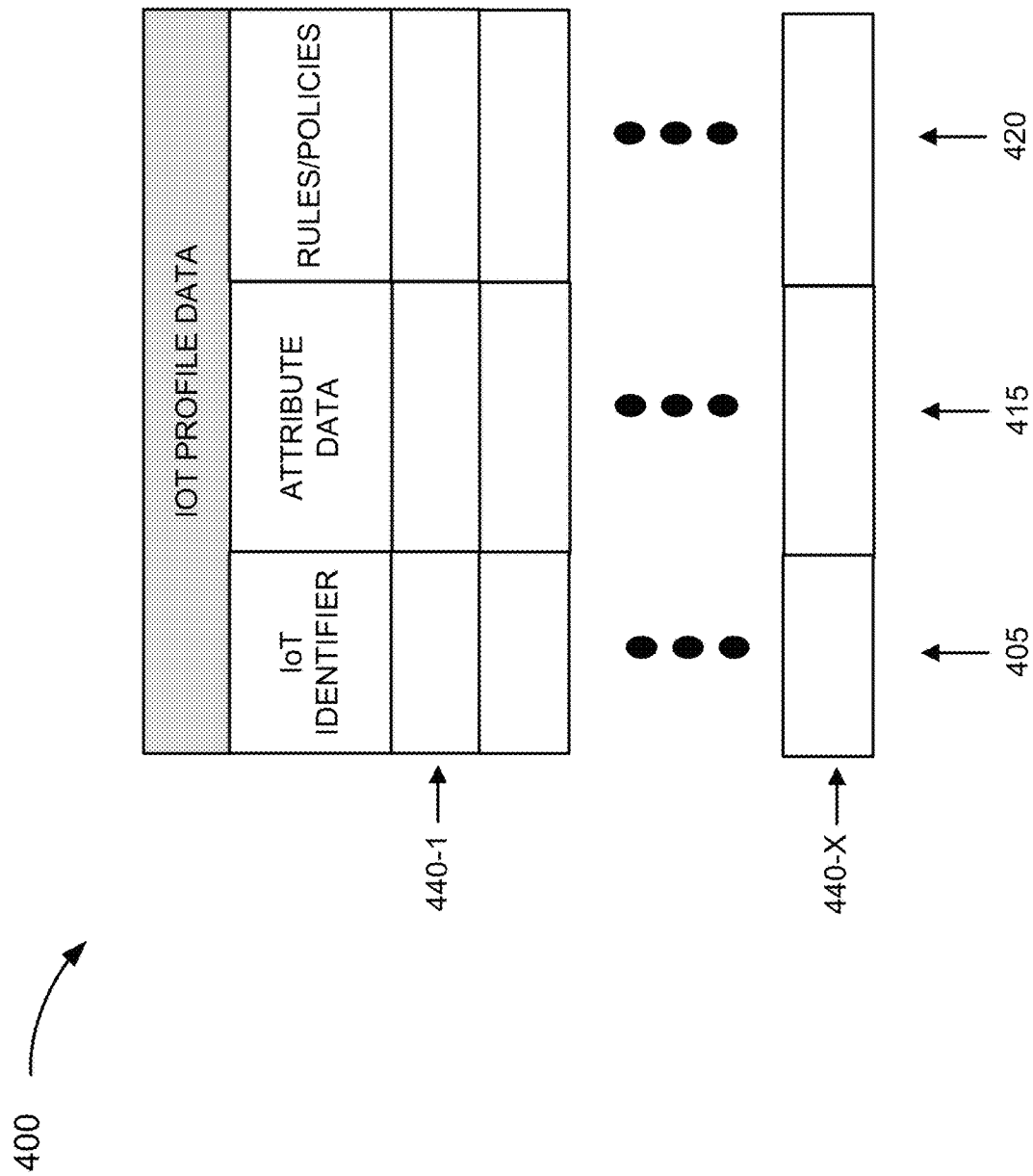
FIG. 4 is a diagram illustrating exemplary IoT profile data used by the authentication service.

Subsequent to a successful registration process, user 195 may log on (303) to authenticate portal 160, and authentication portal 160 may authenticate (305) user 195 based on, for example, login information provided by user 195. Subsequent to a successful log on, user 195 may navigate, via a user interface of authentication portal 160, to provision IoT profiles (307) for a group of IoT devices 180. According to an exemplary embodiment, the IoT profile for each IoT device 180 includes a unique hardware identifier (e.g., an IMEI, a MAC address, or other unique and static hardware identifier) of IoT device 180. The IoT profile may also include rules and/or policies pertaining to IoT device 180. For example, the rules and/or policies may identify an IoT server to which IoT device 180 is permitted to connect to, the number of data transmissions per time period permissible (e.g., 1/per hour, etc.), and/or some other type of policy or rule that pertains to the use of access network 105, core network 115, authenticator 155, and/or the authentication service by IoT device 180. For example, referring to FIG. 4, an exemplary table 400 is illustrated, which stores exemplary IoT profile data. As illustrated, table 400 includes an IoT identifier field 405, an attribute data field 415, and rules/policies field 420. As further illustrated, table 400 includes records 440-1 through 440-X that each includes a grouping of fields 405 through 420 that may be correlated. The IoT profile data is illustrated in tabular form merely for the sake of description. The IoT profile data may be implemented in a data structure different from a table.

IoT identifier field 405 stores data that indicates an identifier of IoT device 180. For example, IoT identifier field 405 stores a unique hardware identifier of IoT device 180. According to an exemplary implementation, IoT identifier field 405 may store an IMEI or a MAC address of IoT device 180. According to another exemplary implementation, the IoT identifier field 405 may store some a unique and static hardware identifier of IoT device 180 other than the IMEI or the MAC address. For example, the hardware identifier may identify a sensor or other hardware component (e.g., a circuit board, a processor, a low power wireless microcontroller (MCU), a memory, etc.) included in IoT device 180.

Attribute data field 415 stores data indicating a characteristic of IoT device 180. For example, attribute data field 415 may store data pertaining to the type of IoT device 180, the make and model of IoT device 180, or other characteristics pertaining to IoT device 180. Rules/policies field 420 stores data that indicates rules and/or policies pertaining to IoT device 180 and the use of access network 105, core network 115, authenticator 155, and/or the authentication service. For example, the rules and/or policies may indicate a server to which IoT device 180 is permitted to connect to, the number of data transmissions per time period permissible (e.g., 1/per hour, etc.), the amount of data to be transmitted and/or received per time period, the certificate authority to be used, or other configurable and enforceable rule or policy. According to other exemplary implementations, table 400 may store additional, fewer, and/or different instances of IoT profile data.

Referring back to FIG. 3, subsequent to the provisioning of the IoT profiles, authentication portal 160 may validate the IoT profiles (309). For example, authentication portal 160 may ensure that all data has been configured for each IoT profile. Additionally, authentication portal 160 may determine whether the IoT profiles are valid. As an example, authentication portal 160 may store hardware identifiers previously uploaded by a manufacturer of end device 190. In this way, when user 195 provisions the profiles, authentication portal 160 may compare the hardware identifiers of the profiles to the hardware identifiers of the manufacturer to ensure that the hardware identifiers of the profiles match and are valid.

According to this exemplary scenario, assume that the provisioning of the IoT profiles is successful. In response, authentication profile 160 may provision the IoT profiles on authenticator 155. For example, authentication profile 160 may transmit the IoT profiles to one or multiple authenticators 155, and authenticator 155 may store the IoT profiles (311).

Figure 5:
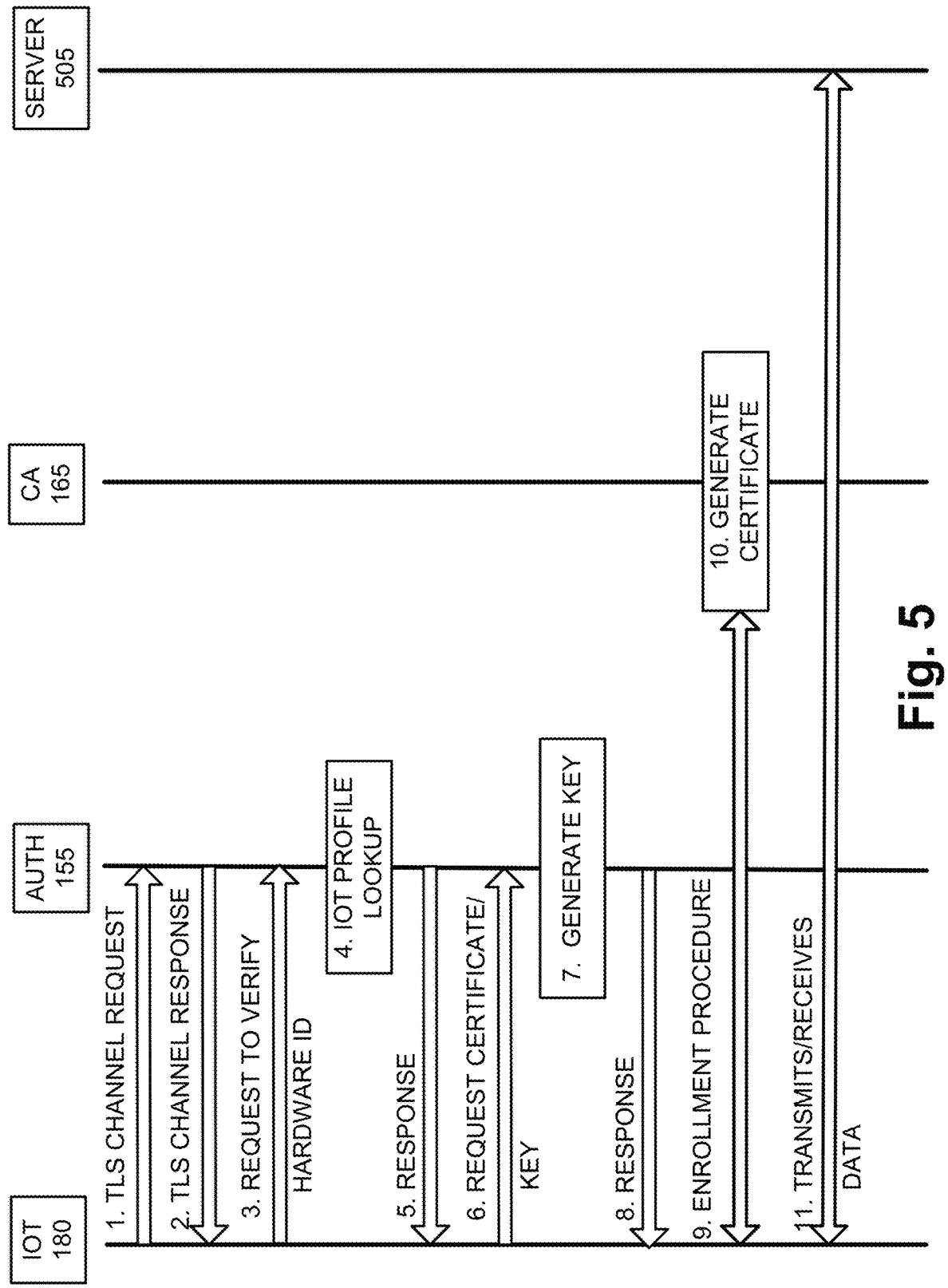
FIG. 5 is a diagram illustrating another exemplary process of the authentication service.

FIG. 5 is a diagram illustrating an exemplary process of the authentication service. The process may be performed subsequent to the provisioning of the IoT profile, as previously described in relation to FIGS. 3 and 4. Additionally, according to an exemplary embodiment, agent 185 of IoT device 180 includes logic that provides the authentication service illustrated and described in FIG. 5. Although not illustrated, a message illustrated in FIG. 5 may traverse network devices of access network 105 and core network 115.

Referring to FIG. 5, as illustrated in step (1), IoT device 180 may transmit a Transport Layer Security (TLS) channel request. For example, referring back to FIG. 2B, in response to the establishment of a default bearer, agent 185 may generate and transmit the TLS channel request to authenticator 155. For example, the TLS channel request may include a version number of TLS/SSL that is supported by IoT device 180, and data indicating a request to establish a TLS channel with authenticator 155. The TLS channel request may also include data indicating a cipher suite supported by IoT device 180, a compression algorithm supported, a session identifier (e.g., an identifier of an active or resumable session), and/or other types of data that may support the communication between IoT device 180 and authenticator 155. Although not illustrated, in response to receiving the TLS channel request, PGW 125 may establish an external bearer to authenticator 155 and route the TLS channel request to authenticator 155 via the external bearer. For example, PGW 125 may establish the external bearer and/or route the TLS channel request to authenticator 155 based on the PCC information. For example, the PCC information may indicate that IoT device 180 is subject to the authentication service, as described herein.

In step (2), in response to receiving the TLS channel request, authenticator 155 may generate and transmit a TLS channel response to IoT device 180. For example, the TLS channel response may indicate the version number of TLS/SSL that is mutually supported. The TLS channel response may also include data that indicates a mutually supported cipher suite, compression algorithm, a session identifier (e.g., an identifier of a new session, an identifier of a resumed session), and/or other data that may support the communication between IoT device 180 and authenticator 155.

In step (3), in response to receiving the TLS channel response, agent 185 of IoT device 180 may generate and transmit a request to verify a hardware identifier of IoT device 180. For example, according to an exemplary scenario in which a TLS channel is set up between IoT device 180 and authenticator 155, agent 185 may generate and transmit a request to verify the hardware identifier of IoT device 180. The request includes the hardware identifier of IoT device 180, which may be stored by agent 185. As illustrated, IoT device 180 may transmit the request to authenticator 155. In step (4), in response to receiving the request, authenticator 155 may perform an IoT profile lookup. For example, referring back to FIG. 4, authenticator 155 may use the hardware identifier included in the request as a basis to search IoT profile data, and determine whether the hardware identifier matches a record (e.g., IoT identifier field 405).

According to this exemplary scenario, assume that authenticator 155 determines that the hardware identifier matches one of records 440. In response, authenticator 155 generates and transmits a response to IoT device 180. For example, the response may indicate that the hardware identifier has been successfully verified. According to an exemplary embodiment, authenticator 155 also generates a token. The token may allow IoT device 180 to communicate with a network device in network 150. For example, the network device may be an IoT server (e.g., a server 505, as illustrated in FIG. 5) that provides an IoT service associated with IoT device 180. By way of further example, as described herein, IoT device 180 may transmit the token to the network device before receiving data from or transmitting data to the network device. The token may limit communication to one or multiple sessions between IoT device 180 and the network device (e.g., server 505). For example, the token may have a time-to-live, restrict the number of sessions, and/or be used as a login key to the network device. According to an exemplary embodiment, authenticator 155 may generate the token based on the successfully verified hardware identifier. For example, the hardware identifier may be used as a seed to generate the token. Although not illustrated, according to such an embodiment, the response may also include the token.

However, although not illustrated, when the hardware identifier does not match any of records 440, the response may indicate that the hardware identifier has not been successfully verified. Also, authenticator 155 may generate and transmit a message to a network device in core network 115 that causes the default bearer to be torn down. For example, authenticator 155 may generate and transmit a delete session request to MME 130. Subsequently, in response to receiving the delete session request, MME 130 may initiate a PDN teardown procedure of the default bearer (e.g., the EPS bearer) and the external bearer established with PGW 125. In this way, IoT device 180 may not establish a session, or transmit and/or receive data from a network device residing in network 150.

In step (6), based on receiving the response (e.g., indicating that the hardware identifier has been successfully verified and the token), agent 185 generates and transmits a request for a key (e.g., a public/private key pair, a public key, or a private key). According to an exemplary implementation, IoT device 180 may use the Simple Certificate Enrollment Protocol (SCEP) or the Enrollment over Secure Transport (EST) protocol to communicate the request to authenticator 155. For example, agent 185 or IoT device 180 may include an SCEP or an EST client. The request may also include the hardware identifier. In step (7), in response to receiving the request, authenticator 155 may generate the key for use by IoT device 180. For example, according to an exemplary embodiment a public key infrastructure (PKI) may be used. According to various exemplary implementations, an asymmetric or a symmetric encryption scheme may be used. In step (8), authenticator 155 generates and transmits a response to IoT device 180. For example, the response includes the key.

In step (9), in response to receiving the response, agent 185 may initiate an enrollment procedure with IoT CA 165 to obtain a certificate. According to various exemplary implementations, agent 185 may include logic that supports the EST standard or the SCEP standard for obtaining the certificate. For example, agent 185 may include logic that provides the enrollment procedure defined in Internet Engineering Task Force (IETF) Request For Comment (RFC) 7030 for EST, which is dated October 2013, and is incorporated by reference in its entirety, or the enrollment procedure defined in the Internet Draft of the IETF for SCEP and dated Nov. 24, 2016, which is also incorporated by reference in its entirety. During the enrollment procedure, in step (10) IoT CA 165 may generate a certificate. For example, agent 185 may generate and transmit a certificate request, which includes a public key. According to this exemplary scenario, assume that the enrollment procedure is successful. In step (11), as illustrated, IoT device 180 may communicate with server 505 of network 150. For example, IoT device 180 may transmit data to and/or receive data from server 505 via PGW 125. Upon initially communicating with server 505, IoT device 180 may provide the token. Server 505 may determine whether the token is valid. A mutual authentication procedure may also be performed in which IoT device 180 verifies a certificate of server 505, and server 505 verifies the certificate of IoT device 180.

Although FIG. 5 illustrates an exemplary process of the authentication service, according to other exemplary embodiments, additional, fewer, and/or different operations of the authentication service may be performed. For example, IoT device 180 may obtain a new certificate and/or a new key after each reboot before communicating with the network device (e.g., server 505) of network 150.

FIG. 6 is a diagram illustrating exemplary components of a device 600 that may correspond to one or more of the devices described herein. For example, device 600 may correspond to components included in network devices of access network 105 and core network 115, authenticator 155, authentication portal 160, IoT CA 165, and IoT device 180. As illustrated in FIG. 6, device 600 includes a bus 605, a processor 610, a memory/storage 615 that stores software 620, a communication interface 625, an input 630, and an output 635. According to other embodiments, device 600 may include fewer components, additional components, different components, and/or a different arrangement of components than those illustrated in FIG. 6 and described herein.

Bus 605 includes a path that permits communication among the components of device 600. For example, bus 605 may include a system bus, an address bus, a data bus, and/or a control bus. Bus 605 may also include bus drivers, bus arbiters, bus interfaces, clocks, and so forth.

Processor 610 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, an MCU, and/or some other type of component that interprets and/or executes instructions and/or data. Processor 610 may be implemented as hardware (e.g., a microprocessor, etc.), a combination of hardware and software (e.g., a SoC, an ASIC, etc.), may include one or multiple memories (e.g., cache, etc.), etc.

Processor 610 may control the overall operation or a portion of operation(s) performed by device 600. Processor 610 may perform one or multiple operations based on an operating system and/or various applications or computer programs (e.g., software 620). Processor 610 may access instructions from memory/storage 615, from other components of device 600, and/or from a source external to device 600 (e.g., a network, another device, etc.). Processor 610 may perform an operation and/or a process based on various techniques including, for example, multithreading, parallel processing, pipelining, interleaving, etc.

Memory/storage 615 includes one or multiple memories and/or one or multiple other types of storage mediums. For example, memory/storage 615 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 615 may include a hard disk (e.g., a magnetic disk, an optical disk, a magneto-optic disk, a solid state disk, etc.) and a corresponding drive. Memory/storage 615 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 615 may include drives for reading from and writing to the storage medium.

Memory/storage 615 may be external to and/or removable from device 600, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 615 may store data, software, and/or instructions related to the operation of device 600.

Software 620 includes an application or a program that provides a function and/or a process. As an example, with reference to IoT device 180 (e.g., agent 185), software 620 may include an application that, when executed by processor 610, provides the functions of the authentication service, as described herein. Similarly, authenticator 155, authentication portal 160, and IoT CA 165 may each include an application that, when executed by processor 610, provides the functions of the authentication service, as described herein. Software 620 may also include firmware, middleware, microcode, hardware description language (HDL), and/or other form of instruction.

Communication interface 625 permits device 600 to communicate with other devices, networks, systems, and/or the like. Communication interface 625 includes one or multiple wireless interfaces and/or wired interfaces. For example, communication interface 625 may include one or multiple transmitters and receivers, or transceivers. Communication interface 625 may operate according to a protocol stack and a communication standard. Communication interface 625 may include an antenna. Communication interface 625 may include various processing logic or circuitry (e.g., multiplexing/de-multiplexing, filtering, amplifying, converting, error correction, etc.).

Input 630 permits an input into device 600. For example, input 630 may include a keyboard, a mouse, a display, a touchscreen, a touchless screen, a button, a switch, an input port, speech recognition logic, and/or some other type of visual, auditory, tactile, etc., input component. Output 635 permits an output from device 600. For example, output 635 may include a speaker, a display, a touchscreen, a touchless screen, a light, an output port, and/or some other type of visual, auditory, tactile, etc., output component.

Device 600 may perform a process and/or a function, as described herein, in response to processor 610 executing software 620 stored by memory/storage 615. By way of example, instructions may be read into memory/storage 615 from another memory/storage 615 (not shown) or read from another device (not shown) via communication interface 625. The instructions stored by memory/storage 615 cause processor 610 to perform a process described herein. Alternatively, for example, according to other implementations, device 600 performs a process described herein based on the execution of hardware (processor 610, etc.).

Figure 7A:
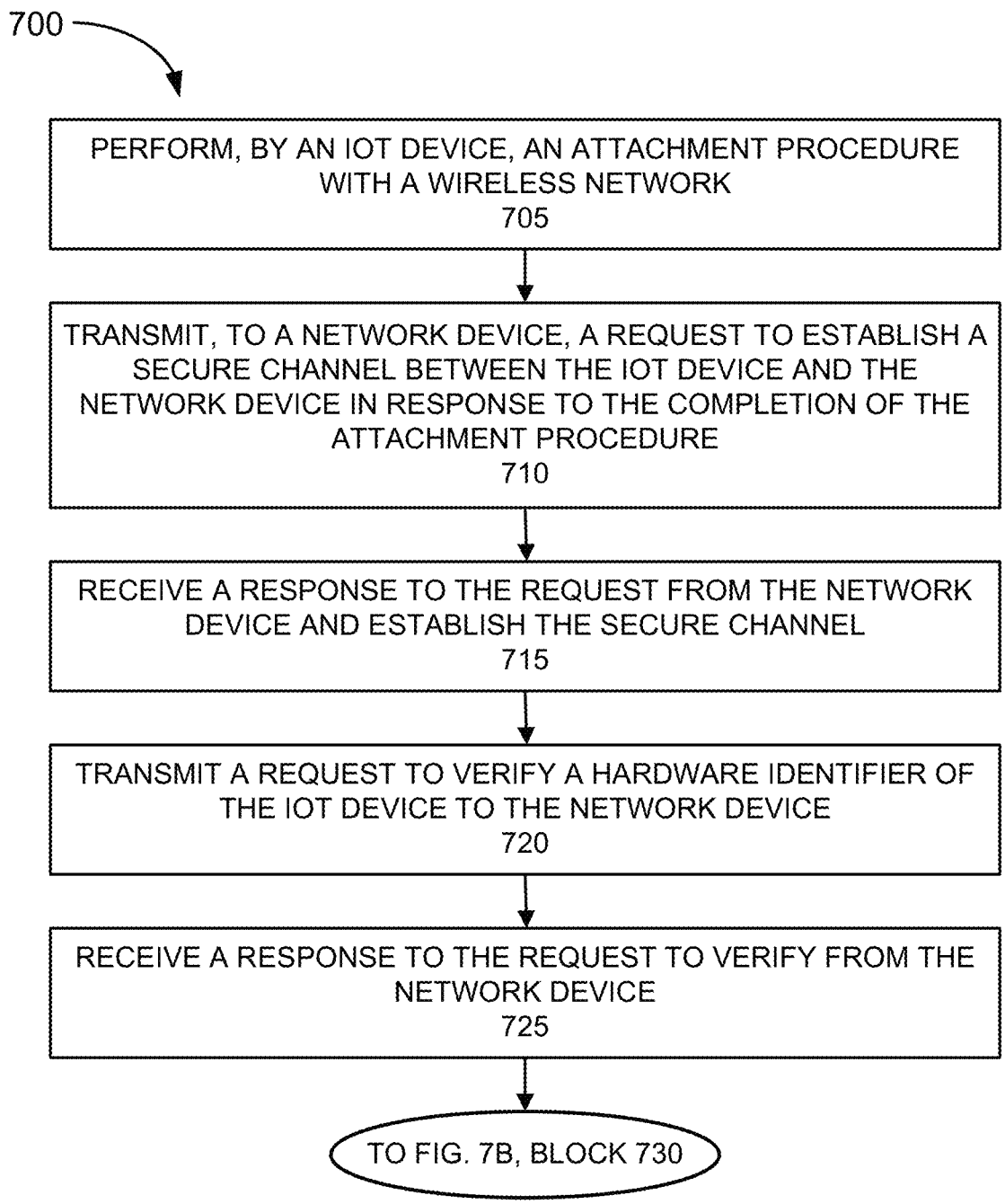
FIGS. 7A and 7B are flow diagrams illustrating an exemplary process of an exemplary embodiment of the authentication service.
Figure 7B:
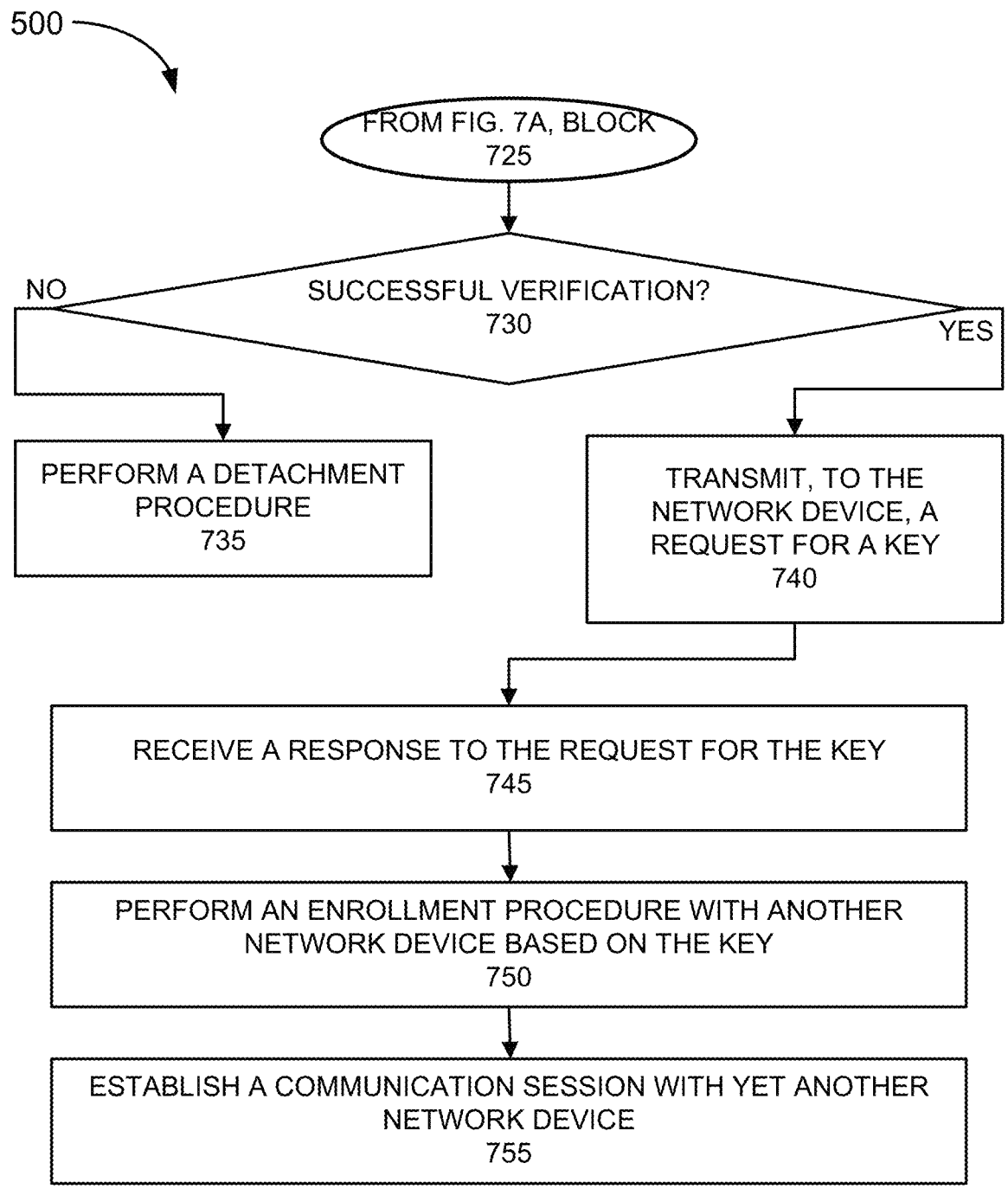

FIGS. 7A and 7B are flow diagrams illustrating an exemplary process 700 of an exemplary embodiment of the authentication service. Process 700 is directed to the process previously described with respect to FIGS. 2A, 2B, and 5, as well as elsewhere in this description in which the authentication service is provided. According to an exemplary embodiment, IoT device 180 performs the steps of process 700. For example, processor 610 executes software 620 to perform the steps illustrated in FIGS. 7A and 7B, and described herein. For example, as previously described, agent 185 of IoT device 180 may perform some of the steps of process 700.

Referring to FIG. 7A, block 705 of process 700, an IoT device may perform an attachment procedure with a wireless network. For example, as previously described, IoT device 180 may perform an attachment procedure with access network 105 and core network 115. The attachment procedure includes authenticating IoT device 180 and establishing a default bearer with PGW 125 based on a successful authentication.

In block 710, the IoT device may request to establish a secure channel with a network device in response to completion of the attachment procedure. For example, IoT device 180 may transmit a TLS channel request to authenticator 155 (e.g., which is route-restricted by PGW 125 to authenticator 155) in response to the establishment of a default bearer and the assignment of an IP address. In this regard, IoT device 180 is prevented from establishing a communication session with various service and/or application layer devices (e.g., servers, etc.) included in various types of networks of network 150 before successfully completing the authentication service, as described herein.

In block 715, the IoT device may receive a response to the request from the network device regarding the establishment of the secure channel. For example, IoT device 180 may receive a TLS channel response from authenticator 155. IoT device 180 and authenticator 155 may establish a secure channel based on the exchange of the TLS channel request and the TLS channel response.

In block 720, the IoT device may transmit a request to verify a hardware identifier of the IoT device to the network device. For example, IoT device 180 may transmit the request, which includes the hardware identifier of IoT device 180, to authenticator 155.

In block 725, the IoT device may receive a response to the request to verify from the network device. For example, IoT device 180 may receive a response, which includes an indication whether IoT device 180 has been successfully authenticated or not, from authenticator 155.

Referring to FIG. 7B, in block 730, the IoT device may determine whether it has been successfully verified. For example, based on a reading of the information carried in the response, IoT device 180 may determine whether or not it has been successfully verified. According to an exemplary implementation, as previously described, the response indicating that IoT device 180 has been successfully authenticated may also include a token.

When it is determined that IoT device has not been successfully authenticated (block 730—NO), the IoT device may perform a detachment procedure (block 735). For example, IoT device 180 may receive a network-side initiated message pertaining to the tearing down of the default bearer and/or complete detachment from access network 105 and core network 115. As an example, IoT device 180 may receive a Detach Accept message from MME 130 and/or an RRC Connection Release message from eNB 110. In some embodiments, access network 105 and/or core network 115 may prevent IoT device 180 from re-attaching subsequent to the completion of the detachment procedure. For example, access network 105 and/or core network 115 may maintain a registry of non-authenticated interactions, which may be queried upon when subsequent attachment requests are made (i.e., before the authentication process described herein).

When it is determined that IoT device has been successfully authenticated (block 730—YES), the IoT device may transmit a request for a key to the network device (block 740). For example, IoT device 180 may store the token included in the response that indicated successful authentication. IoT device 180 may generate and transmit a request for a key (e.g., a public key, etc.) to authenticator 155.

In block 745, the IoT device may receive a response to the request for the key from the network device. For example, IoT device 180 may receive the response that includes the key pertaining to IoT device 180. The key may include a private key, a public key, or both.

In block 750, the IoT device may perform an enrollment procedure with another network device. For example, in response to receiving and storing the key, IoT device 180 may perform an enrollment procedure with IoT CA 165 based on the SCEP standard or the EST standard. By way of further example, IoT device 180 may request a certificate from IoT CA 165, and upon successfully completing the enrollment procedure, obtain the certificate.

In block 755, the IoT device may establish a communication session with yet another network device. For example, subsequent to completing the enrollment procedure, IoT device 180 may establish a communication session with server 505 of network 150. IoT device 180 may use the token to establish the communication session. Additionally, as previously described, a single or a mutual verification procedure of a certificate may be performed. IoT device 180 may generate data (e.g., IoT data) and transmit the data to server 505. As an example, the IoT data may be sensor data that pertains to an IoT service.

Although FIGS. 7A and 7B illustrate an exemplary process of the authentication service, according to other embodiments, process 700 may include additional operations, fewer operations, and/or different operations than those illustrated in FIGS. 7A and 7B, and described herein.

Figure 8:
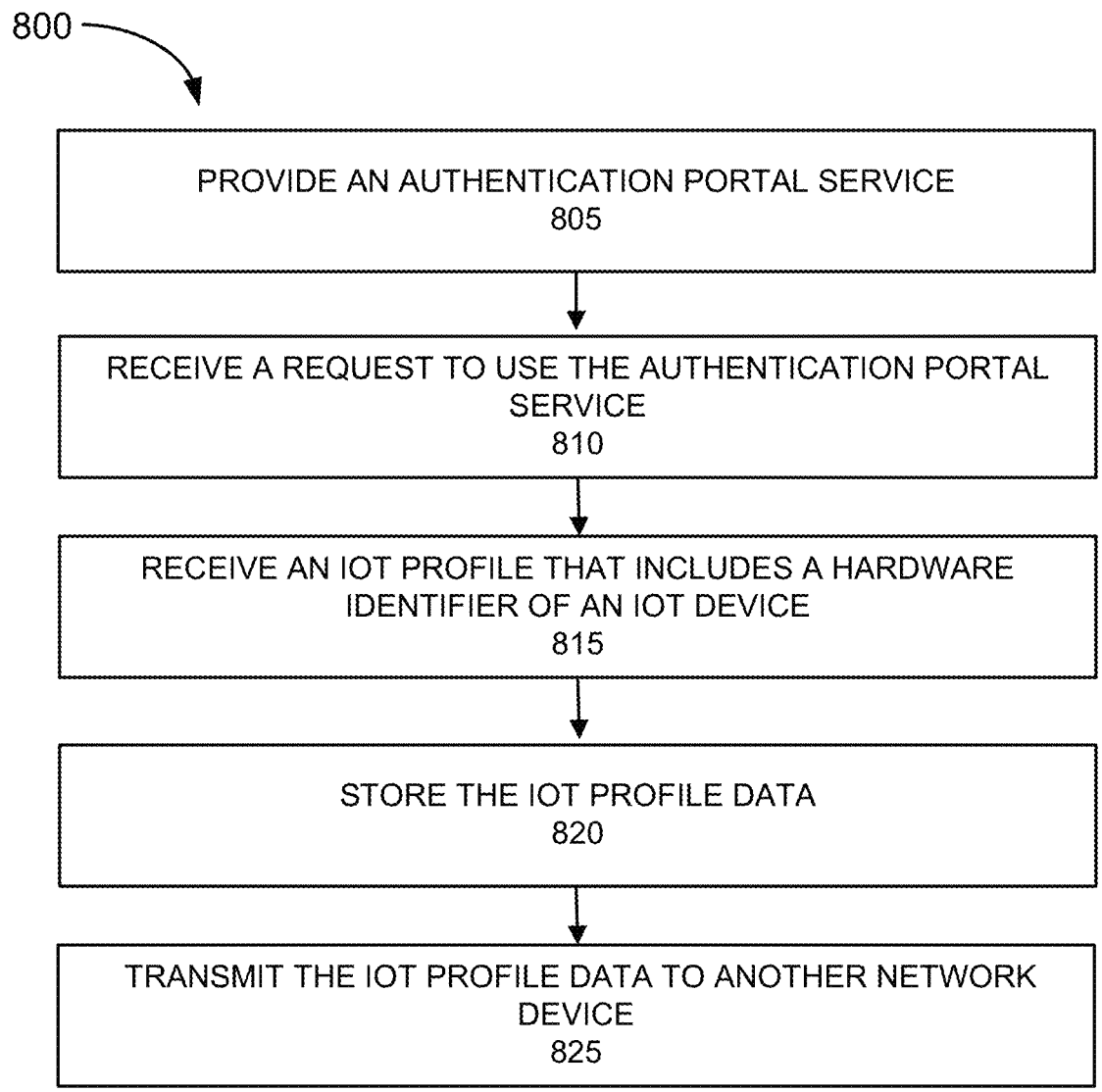
FIG. 8 is a flow diagram illustrating another exemplary process of an exemplary embodiment of the authentication service.

FIG. 8 is a flow diagram illustrating an exemplary process 800 of an exemplary embodiment of the authentication service. Process 800 is directed to the process previously described with respect to FIG. 3, as well as elsewhere in this description in which the authentication service is provided. According to an exemplary embodiment, authentication portal 160 performs the steps of process 800. For example, processor 610 executes software 620 to perform the steps illustrated in FIG. 8, and described herein.

Referring to FIG. 8, in block 805, a network device may provide an authentication portal service. For example, authentication portal 160 may provide the authentication portal service that includes receiving an IoT data profile, which includes a hardware identifier of IoT device 180, from a user, and providing the IoT data profile to authenticator 155. The authentication service may also include validating the IoT data profile.

In block 810, the network device receives a request to use the authentication portal service. For example, assume that user 195 previously on-boarded to (e.g., registered with) the authentication service, and subsequently logs on to authenticator portal 160. User 195 may request, via a user interface of authentication portal 160, to provision an IoT profile. The IoT profile includes a hardware identifier of IoT device 180. The IoT profile may include attribute data, and rules and/or policies.

In block 815, the network device receives an IoT profile that includes a hardware identifier of an IoT device. For example, authentication portal 160 may provide, via a user interface, a provisioning service in which user 195 may provision the IoT profile. According to an exemplary implementation, the user interface may allow user 195 to create (partially or wholly) the IoT profile based on various menus and/or input fields. According to another exemplary implementation, the user interface may allow user 195 to upload the IoT profile from end device 190. For example, user 195 may create or have stored the IoT profile (partially or wholly) at end device 190. Authentication portal 160 may validate various aspects of the IoT profile (e.g., rules, policies, hardware identifiers, etc.).

In block 820, the network device stores the IoT profile. For example, subsequent to successfully validating the IoT profile, authentication portal 160 may store the IoT profile associated with subscription data of user 195.

In block 825, the network device may transmit the IoT profile data to another network device. For example, authentication portal 160 may transmit the IoT profile to authenticator 155.

Although FIG. 8 illustrates an exemplary process of the authentication service, according to other embodiments, process 800 may include additional operations, fewer operations, and/or different operations than those illustrated in FIG. 8, and described herein. For example, when the IoT profile includes rules and/or polices, authentication portal 160 may determine whether the rules and/or policies are acceptable or valid.

Figure 9:
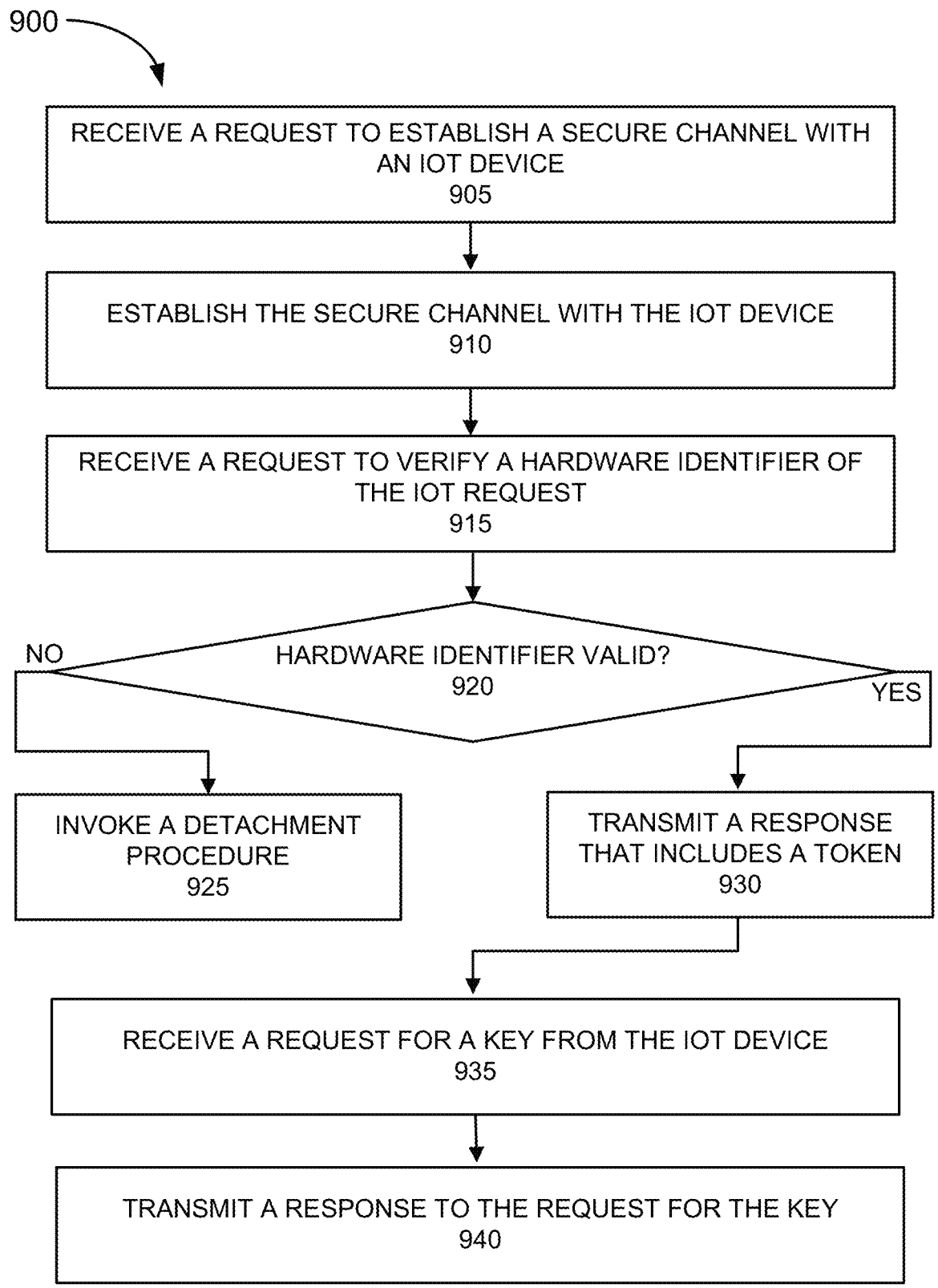
FIG. 9 is a flow diagram illustrating yet another exemplary process of an exemplary embodiment of the authentication service.

FIG. 9 is a flow diagram illustrating an exemplary process 900 of an exemplary embodiment of the authentication service. Process 900 is directed to the process previously described with respect to FIG. 5, as well as elsewhere in this description in which the authentication service is provided. According to an exemplary embodiment, authenticator 155 performs the steps of process 900. For example, processor 610 executes software 620 to perform the steps illustrated in FIG. 9, and described herein. It may be assumed that process 900 occurs subsequent to a provisioning of an IoT profile pertaining to an IoT device, as described herein. Additionally, according to an exemplary embodiment, process 900 may be performed (immediately) subsequent to an attachment of IoT device 180 to a wireless network.

Referring to FIG. 9, in block 905, in block 905, a network device may receive a request to establish a secure channel with an IoT device. For example, authenticator 155 may receive a request to establish a TLS channel with IoT device 180 via a default bearer (e.g., an EPS bearer between IoT device 180 and PGW 125) and an external bearer (e.g., between PGW 125 and authenticator 155). According to an exemplary implementation, PGW 125 may establish the external bearer in response to receiving the request. According to another exemplary implementation, PGW 125 may establish the external bearer during that attachment procedure (e.g., subsequent to receiving the PCC information, subsequent to transmitting a Create Session Request to SGW 120, etc.).

In block 910, the network device may establish the secure channel in response to request. For example, authenticator 155 may generate and transmit a response to the request for establishing the TLS channel.

In block 915, the network device may receive a request to verify a hardware identifier of the IoT device. For example, authenticator 155 may receive a request that includes the hardware identifier of IoT device 180. For example, the hardware identifier may be implemented as an IMEI, a MAC address, or other unique and static identifier of a component of IoT device 180 (e.g., memory, MCU, etc.) or IoT device 180.

In block 920, the network device determines whether the hardware identifier is valid. For example, authenticator 155 may perform a lookup in table 400 to determine whether the hardware identifier matches one of the hardware identifiers stored in IoT identifier field 405. When authenticator 155 determines that a match exists, authenticator 155 may determine that the hardware identifier is valid. Conversely, when authenticator 155 is unable to find a match, authenticator 155 may determine that the hardware identifier is not valid.

When it is determined that the hardware identifier is not valid (block 920—NO), the network device may invoke a detachment procedure (block 925). For example, authenticator 155 may generate and transmit a message to a network device of core network 115. For example, authenticator 155 may generate and transmit a message to MME 130. The message includes the hardware identifier (e.g., to identify IoT device 180). Upon receipt of the message, MME 130 may initiate the tearing down of a default bearer associated with IoT device. For example, MME 130 may transmit a Delete Session Request to SGW 120. In the case that the hardware identifier is an identifier different from, for example, the IMEI, MME 130 may correlate the hardware identifier to an identifier used during the attachment procedure. As an example, the subscription data obtained from HSS 135 may include the hardware identifier. According to such an exemplary implementation, MME 130 includes logic that supports the authentication service so as to perform the detachment procedure, as described herein. Additionally, as previously described, the detachment procedure may include release of the RRC connection between IoT device 180 and eNB 110. Also, authenticator 155 may generate and transmit a response, which indicates that the hardware identifier is not valid, to IoT device 180. According to another exemplary implementation, authenticator 155 may transmit the message to MME 130 via PGW 125 and SGW 120.

When it is determined that the hardware identifier is valid (block 920—YES), the network device may generate and transmit a response, which indicates that the hardware identifier is valid, and a token, to the IoT device. For example, authenticator 155 may generate a token based on the validated hardware identifier. According to an exemplary implementation, the token may grant authorization to IoT device 180 to communicate with server 505. Authenticator 155 may generate and transmit a response that includes the token.

In block 935, the network device may receive a request for a key from the IoT device. In response to the request, authenticator 155 may generate a key (e.g., public, private, or both).

In block 940, the network device may transmit a response to the request for the key to the IoT device. For example, authenticator 155 may generate and transmit a response, which includes the key pertaining to IoT device, to IoT device 180.

Although FIG. 9 illustrates an exemplary process of the authentication service, according to other embodiments, process 900 may include additional operations, fewer operations, and/or different operations than those illustrated in FIG. 9, and described herein.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive. For example, although the foregoing description of the authentication service may be implemented to authenticate IoT devices, the authentication service may be implemented to authenticate an end device other than an IoT device (e.g., a non-IoT device).

The words "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is intended to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 7A, 7B, 8, and 9, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic," a "component," or an "element." The logic, the component, or the element, may include, for example, hardware (e.g., processor 610, etc.), or a combination of hardware and software (e.g., processor 610 and software 620). The embodiments have been described without reference to the specific software code since the software code can be designed to implement the embodiments based on the description herein and commercially available software design environments and/or languages.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 610) of a computational device. A non-transitory storage medium includes one or more of the storage mediums described in relation to memory/storage 615.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

What is claimed is:

1. A method comprising:
    storing, by an Internet of Things (IoT) device, a hardware identifier that uniquely identifies the IoT device;
    performing, by the IoT device, an attachment procedure with a wireless network, wherein the attachment procedure includes authenticating the IoT device and establishing a bearer connection with a first network device of a core network of the wireless network;
    establishing, by the IoT device, a secure channel via the bearer connection with an authentication device, in response to successfully completing the attachment procedure, wherein the IoT device is route-restricted to the authentication device when the attachment procedure is completed;
    transmitting, by the IoT device via the secure channel to the authentication device, a first request to authenticate the IoT device, wherein the first request includes the hardware identifier;
    receiving, by the IoT device via the secure channel from the authentication device, a first response that indicates whether the IoT device is authenticated;
    determining, by the IoT device, whether the IoT device is authenticated based on the first response; and
    transmitting, by the IoT device via the secure channel to the authentication device, a second request for a key in response to determining that the IoT device is authenticated.

2. The method of claim 1, wherein the hardware identifier is a media access control address or an International Mobile Equipment Identity.

3. The method of claim 1, wherein the authentication device provides only an authentication service before allowing the IoT device to communicate with any network device of an external network.

4. The method of claim 1, further comprising:
    receiving, by the IoT device via the secure channel from the authentication device, a second response that includes the key and a token, and is responsive to the second request.

5. The method of claim 4, wherein the key includes at least one of a public key or a private key.

6. The method of claim 4, further comprising:
    obtaining, by the IoT device from a second network device, a digital certificate based on the key and in response to receiving the second response.

7. The method of claim 6, further comprising:
    generating IoT data pertaining to an IoT service;
    establishing, by the IoT device to a third network device, a communication session using the digital certificate and the token; and
    transmitting, by the IoT device to the third network device, the IoT data.

8. The method of claim 1, wherein the hardware identifier is an identifier that is different from an identifier used to authenticate the IoT device by the wireless network.

9. An Internet of Things (IoT) device comprising:
    a communication interface;
    a memory, wherein the memory stores instructions; and a processor, wherein the processor executes the instructions to:
- store a hardware identifier that uniquely identifies the IoT device;
- perform, via the communication interface, an attachment procedure with a wireless network, wherein the attachment procedure includes authenticating the IoT device and establishing a bearer connection with a first network device of a core network of the wireless network;
- establish, via the communication interface and the bearer connection, a secure channel with an authentication device, in response to successfully completing the attachment procedure, wherein the IoT device is route-restricted to the authentication device when the attachment procedure is completed;
- transmit, via the communication interface via the secure channel from the authentication device, a first request to authenticate the IoT device, wherein the first request includes the hardware identifier;
- receive, via the communication interface and the secure channel from the authentication device, a first response that indicates whether the IoT device is authenticated;
- determine whether the IoT device is authenticated based on the first response; and
- transmit, via the communication interface and the secure channel to the authentication device, a second request for a key in response to a determination that the IoT device is authenticated.

10. The IoT device of claim 9, wherein the hardware identifier is a media access control address or an International Mobile Equipment Identity.

11. The IoT device of claim 9, wherein the authentication device provides only an authentication service before allowing the IoT device to communicate with any network device of an external network.

12. The IoT device of claim 9, wherein the processor further executes the instructions to:
- receive, via the communication interface and the secure channel from the authentication device, a second response that includes the key and a token, and is responsive to the second request.

13. The IoT device of claim 12, wherein the key includes at least one of a public key or a private key.

14. The IoT device of claim 12, wherein the processor further executes the instructions to:
- obtain, via the communication interface from a second network device, a digital certificate based on the key and in response to receipt of the second response.

15. The IoT device of claim 14, wherein the processor further executes the instructions to:
- generate IoT data pertaining to an IoT service;
- establish, via the communication interface to a third network device, a communication session using the digital certificate and the token; and
- transmit, via the communication interface to the third network device, the IoT data.

16. A non-transitory computer-readable storage medium storing instructions executable by a processor of a device, which when executed cause the device to:
- store a hardware identifier that uniquely identifies the device;
- perform an attachment procedure with a wireless network, wherein the attachment procedure includes authenticating the device and establishing a bearer connection with a first network device of a core network of the wireless network;
- establish a secure channel via the bearer connection with an authentication device, in response to successfully completing the attachment procedure, wherein the device is route-restricted to the authentication device when the attachment procedure is completed;
- transmit, via the secure channel to the authentication device, a first request to authenticate the device, wherein the first request includes the hardware identifier;
- receive, via the secure channel from the authentication device, a first response that indicates whether the device is authenticated;
- determine whether the device is authenticated based on the first response; and
- transmit, via the secure channel to the authentication device, a second request for a key in response to a determination that the device is authenticated.

17. The non-transitory computer-readable storage medium of claim 16, wherein the hardware identifier is an identifier that is different from an identifier used to authenticate the device by the wireless network.

18. The non-transitory, computer-readable storage medium of claim 16, wherein the hardware identifier is a media access control address or an International Mobile Equipment Identity.

19. The non-transitory, computer-readable storage medium of claim 16, further storing instructions executable by the processor of the device, which when executed cause the device to:
- receive, via the secure channel from the authentication device, a second response that includes the key and a token, and is responsive to the second request; and
- obtain, from a second network device, a digital certificate based on the key and in response to receipt of the second response.

20. The non-transitory, computer-readable storage medium of claim 19, further storing instructions executable by the processor of the device, which when executed cause the device to:
- generate IoT data pertaining to an IoT service;
- establish a communication session with a third network device using the digital certificate and the token; and
- transmit, to the third network device, the IoT data.

* * * * *